(12) United States Patent
Whittington et al.

(10) Patent No.: US 12,371,371 B2
(45) Date of Patent: Jul. 29, 2025

(54) METHOD OF FORMING A GYPSUM PANEL INCLUDING A STARCH LAYER

(71) Applicant: Gold Bond Building Products, LLC, Charlotte, NC (US)

(72) Inventors: Gene Whittington, Fort Mill, SC (US); Robert Piercy, Mesa, AZ (US); Tom Griffith, Chandler, AZ (US); Al Flanders, Mesa, AZ (US)

(73) Assignee: Gold Bond Building Products, LLC, Charlotte, NC (US)

( * ) Notice: Subject to any disclaimer, the term of this patent is extended or adjusted under 35 U.S.C. 154(b) by 302 days.

(21) Appl. No.: 17/218,911

(22) Filed: Mar. 31, 2021

(65) Prior Publication Data
US 2021/0309571 A1 Oct. 7, 2021

Related U.S. Application Data

(60) Provisional application No. 63/004,047, filed on Apr. 2, 2020.

(51) Int. Cl.
| | | |
|---|---|---|
| C04B 11/00 | (2006.01) | |
| B28B 19/00 | (2006.01) | |
| C04B 41/00 | (2006.01) | |
| C04B 41/45 | (2006.01) | |
| C04B 41/48 | (2006.01) | |
| C04B 41/50 | (2006.01) | |
| C04B 41/63 | (2006.01) | |
| C04B 41/65 | (2006.01) | |
| C04B 111/00 | (2006.01) | |

(52) U.S. Cl.
CPC ........ *C04B 11/005* (2013.01); *B28B 19/0092* (2013.01); *C04B 41/009* (2013.01); *C04B 41/4539* (2013.01); *C04B 41/4803* (2013.01); *C04B 41/5085* (2013.01); *C04B 41/63* (2013.01); *C04B 41/65* (2013.01); *C04B 2111/00629* (2013.01)

(58) Field of Classification Search
CPC ..... C04B 41/65; C04B 41/63; C04B 41/5085; C04B 41/4803; C04B 41/4539; C04B 41/009; C04B 11/005; B28B 9/0092
See application file for complete search history.

(56) References Cited

U.S. PATENT DOCUMENTS

| | | |
|---|---|---|
| 1,620,067 A | 3/1927 | Brookby |
| 2,080,009 A | 5/1937 | Roos |
| 2,207,339 A | 7/1940 | Camp |
| 2,269,457 A | 1/1942 | Jurgensen |
| 2,292,011 A | 8/1942 | Parsons |

(Continued)

FOREIGN PATENT DOCUMENTS

| | | |
|---|---|---|
| CA | 1087080 | 10/1980 |
| WO | WO2015094394 | 6/2015 |

*Primary Examiner* — Alex B Efta
(74) *Attorney, Agent, or Firm* — Dority & Manning, P.A.

(57) ABSTRACT

In the present disclosure, a method of forming a gypsum panel is disclosed. The method comprises: providing a first facing material, forming a starch slurry by combining starch and water at a shear rate of 3,000 rpm or more, providing the starch slurry onto the first facing material, depositing a gypsum slurry comprising stucco and water onto the starch slurry on the first facing material, providing a second facing material on the gypsum slurry, and allowing the stucco to convert to calcium sulfate dihydrate.

22 Claims, 1 Drawing Sheet

(56) References Cited

U.S. PATENT DOCUMENTS

| | | | |
|---|---|---|---|
| 2,487,036 A | 11/1949 | Wise | |
| 2,517,070 A | 8/1950 | Wise | |
| 3,516,882 A | 6/1970 | Cummisford | |
| 3,944,698 A | 3/1976 | Dierks et al. | |
| 4,009,062 A * | 2/1977 | Long | B32B 13/08 |
| | | | 156/39 |
| 4,051,291 A | 2/1977 | Long | |
| 4,117,183 A | 9/1978 | Long | |
| 4,119,752 A | 10/1978 | Long | |
| 4,392,896 A | 7/1983 | Sakakibara | |
| 4,681,644 A | 7/1987 | Dozsa | |
| 4,810,569 A | 3/1989 | Lehnert et al. | |
| 5,371,989 A | 12/1994 | Lehnert et al. | |
| 5,534,059 A | 7/1996 | Immordino | |
| 5,558,710 A | 9/1996 | Baig | |
| 5,922,447 A | 7/1999 | Baig | |
| 6,200,937 B1 | 3/2001 | Brennan et al. | |
| 6,221,521 B1 | 4/2001 | Lynn et al. | |
| 6,268,042 B1 | 7/2001 | Baig | |
| 6,319,312 B1 * | 11/2001 | Luongo | E04C 2/043 |
| | | | 156/39 |
| 6,342,284 B1 | 1/2002 | Yu et al. | |
| 6,379,458 B1 | 4/2002 | Immordino et al. | |
| 6,387,172 B1 | 5/2002 | Yu et al. | |
| 6,409,823 B1 | 6/2002 | Shake et al. | |
| 6,481,171 B2 | 11/2002 | Yu et al. | |
| 6,632,550 B1 | 10/2003 | Yu et al. | |
| 6,746,781 B2 | 6/2004 | Francis et al. | |
| 6,800,131 B2 | 10/2004 | Yu et al. | |
| 6,815,049 B2 | 11/2004 | Veeramasuneni et al. | |
| 7,048,794 B2 | 5/2006 | Tagge et al. | |
| 7,056,582 B2 | 6/2006 | Carbo et al. | |
| 7,101,426 B2 | 9/2006 | Tagge et al. | |
| 7,172,403 B2 | 2/2007 | Burke | |
| 7,244,304 B2 | 7/2007 | Yu et al. | |
| 7,425,236 B2 | 9/2008 | Yu et al. | |
| 7,572,329 B2 | 8/2009 | Liu et al. | |
| 7,637,996 B2 | 12/2009 | Blackburn et al. | |
| 7,718,019 B2 | 5/2010 | Wittbold et al. | |
| 7,731,794 B2 | 6/2010 | Yu et al. | |
| 7,736,720 B2 | 6/2010 | Yu et al. | |
| 7,758,980 B2 | 7/2010 | Yu et al. | |
| 7,767,019 B2 | 8/2010 | Liu et al. | |
| 7,771,851 B2 | 8/2010 | Song et al. | |
| 7,776,461 B2 | 8/2010 | Blackburn et al. | |
| 7,776,462 B2 | 8/2010 | Liu et al. | |
| 7,803,226 B2 | 9/2010 | Wang et al. | |
| 7,811,685 B2 | 10/2010 | Wang et al. | |
| 7,815,730 B2 | 10/2010 | Wang et al. | |
| 7,875,358 B2 | 1/2011 | Englert et al. | |
| 7,964,034 B2 | 6/2011 | Yu et al. | |
| 8,016,960 B2 | 9/2011 | Wittbold et al. | |
| 8,028,803 B1 | 10/2011 | Englert | |
| 8,057,915 B2 | 11/2011 | Song et al. | |
| 8,088,218 B2 | 1/2012 | Blackburn et al. | |
| 8,118,928 B1 | 2/2012 | Yu et al. | |
| 8,133,354 B2 | 3/2012 | Baig | |
| 8,133,600 B2 | 3/2012 | Wang et al. | |
| 8,142,915 B2 | 3/2012 | Blackburn et al. | |
| 8,197,952 B2 | 6/2012 | Yu et al. | |
| 8,252,110 B2 | 8/2012 | Rigaudon et al. | |
| 8,257,489 B2 | 9/2012 | Yu et al. | |
| 8,262,820 B2 | 9/2012 | Yu et al. | |
| 8,303,159 B2 | 11/2012 | Yu et al. | |
| 8,303,709 B2 | 11/2012 | Yu et al. | |
| 8,323,785 B2 | 12/2012 | Yu et al. | |
| 8,337,976 B2 | 12/2012 | Mayers et al. | |
| RE44,070 E | 3/2013 | Yu et al. | |
| 8,404,365 B2 | 3/2013 | Burdick | |
| 8,444,787 B2 | 5/2013 | Wittbold et al. | |
| 8,470,461 B2 | 6/2013 | Yu et al. | |
| 8,500,904 B2 | 8/2013 | Yu et al. | |
| 8,501,074 B2 | 8/2013 | Wang et al. | |
| 8,702,881 B2 | 4/2014 | Yu et al. | |
| 8,882,943 B2 | 11/2014 | College et al. | |
| 8,945,295 B2 | 2/2015 | Brown et al. | |
| 8,961,675 B2 | 2/2015 | Albarran et al. | |
| 9,023,143 B2 | 5/2015 | Albarran | |
| 9,133,060 B2 | 9/2015 | Gao et al. | |
| 9,434,655 B2 | 9/2016 | Jaffel | |
| 9,540,287 B2 | 1/2017 | Aldabaibeh et al. | |
| 9,540,810 B2 | 1/2017 | Sang et al. | |
| 9,593,044 B2 | 3/2017 | Moore et al. | |
| 9,617,184 B2 | 4/2017 | Taboulot et al. | |
| 9,623,586 B2 | 4/2017 | Yu et al. | |
| 9,650,305 B2 | 5/2017 | Wang et al. | |
| 9,656,876 B1 | 5/2017 | College et al. | |
| 9,764,983 B2 | 9/2017 | Chuda et al. | |
| 9,771,486 B2 | 9/2017 | Lee et al. | |
| 9,828,441 B2 | 11/2017 | Sang et al. | |
| 9,856,170 B2 | 1/2018 | Chuda et al. | |
| 9,868,269 B2 | 1/2018 | Chuda et al. | |
| 9,896,807 B2 | 2/2018 | Englert et al. | |
| 9,902,656 B2 | 2/2018 | College et al. | |
| 9,909,310 B2 | 3/2018 | Frank et al. | |
| 9,938,192 B2 | 4/2018 | Moore et al. | |
| 9,945,119 B2 | 4/2018 | Aldabaibeh et al. | |
| 9,963,391 B2 | 5/2018 | Abolt et al. | |
| 10,053,860 B2 | 8/2018 | Li et al. | |
| 10,245,755 B2 | 4/2019 | Yu et al. | |
| 10,259,196 B2 | 4/2019 | Francis | |
| 10,399,899 B2 | 9/2019 | Sang et al. | |
| 10,399,904 B2 | 9/2019 | Ironside et al. | |
| 10,407,344 B2 | 9/2019 | Vilinska et al. | |
| 10,421,250 B2 | 9/2019 | Li et al. | |
| 10,421,251 B2 | 9/2019 | Li et al. | |
| 10,442,732 B2 | 10/2019 | Vilinska et al. | |
| 10,464,847 B2 | 11/2019 | Sang et al. | |
| 10,532,955 B2 | 1/2020 | College et al. | |
| 10,662,112 B2 | 5/2020 | Vilinska et al. | |
| 10,683,235 B2 | 6/2020 | Morlat et al. | |
| 10,696,594 B2 | 6/2020 | Xu et al. | |
| 10,731,343 B2 | 8/2020 | Brooks et al. | |
| 10,737,979 B2 | 8/2020 | Lu et al. | |
| 10,737,981 B2 | 8/2020 | Emami et al. | |
| 10,793,472 B2 | 10/2020 | Gao et al. | |
| 10,850,425 B2 | 12/2020 | Yu et al. | |
| 10,875,935 B2 | 12/2020 | Sang et al. | |
| 10,919,808 B2 | 2/2021 | Sang et al. | |
| 11,008,257 B2 | 5/2021 | Sang et al. | |
| 2002/0045074 A1 | 4/2002 | Yu et al. | |
| 2006/0278127 A1 | 12/2006 | Liu et al. | |
| 2006/0280899 A1 | 12/2006 | Liu et al. | |
| 2007/0102237 A1 | 5/2007 | Baig | |
| 2008/0070026 A1 | 3/2008 | Yu et al. | |
| 2008/0176053 A1 | 7/2008 | Miller et al. | |
| 2009/0036572 A1 | 2/2009 | Geeraert | |
| 2010/0075166 A1 | 3/2010 | Gilley | |
| 2010/0075167 A1 | 3/2010 | Gilley et al. | |
| 2011/0195241 A1 | 8/2011 | Yu et al. | |
| 2012/0142525 A1 | 6/2012 | Chevigny et al. | |
| 2012/0167805 A1 | 7/2012 | Wittbold et al. | |
| 2012/0214887 A1 * | 8/2012 | Stav | C04B 28/14 |
| | | | 106/680 |
| 2012/0285643 A1 | 11/2012 | Yu et al. | |
| 2013/0101838 A1 | 4/2013 | Yu et al. | |
| 2013/0248078 A1 | 9/2013 | Yu et al. | |
| 2014/0113124 A1 | 4/2014 | Sang et al. | |
| 2014/0186643 A1 | 7/2014 | Yu et al. | |
| 2014/0302280 A1 | 10/2014 | Gautam et al. | |
| 2015/0011138 A1 | 1/2015 | Gao et al. | |
| 2015/0024228 A1 | 1/2015 | Li et al. | |
| 2015/0064488 A1 * | 3/2015 | Foster | C04B 28/14 |
| | | | 428/514 |
| 2015/0104629 A1 | 4/2015 | Cao et al. | |
| 2015/0175482 A1 | 6/2015 | Stav et al. | |
| 2015/0266270 A1 | 9/2015 | Yu et al. | |
| 2016/0060460 A1 | 3/2016 | Welch | |
| 2016/0096772 A1 | 4/2016 | Hotchin et al. | |
| 2016/0230013 A1 | 8/2016 | Englert et al. | |
| 2016/0258157 A1 | 9/2016 | Yu et al. | |
| 2016/0304397 A1 | 10/2016 | Yu et al. | |
| 2016/0375651 A1 * | 12/2016 | Li | C04B 28/14 |
| | | | 428/213 |

(56) References Cited

U.S. PATENT DOCUMENTS

| | | |
|---|---|---|
| 2016/0375655 A1 | 12/2016 | Li et al. |
| 2016/0375656 A1 | 12/2016 | Li et al. |
| 2016/0376191 A1 | 12/2016 | Li et al. |
| 2017/0073272 A1 | 3/2017 | Sang et al. |
| 2017/0096369 A1 | 4/2017 | Vilinska et al. |
| 2017/0129813 A1 | 5/2017 | Yu et al. |
| 2017/0190147 A1 | 7/2017 | Brooks et al. |
| 2017/0306623 A1 | 10/2017 | Brooks et al. |
| 2017/0327424 A1 | 11/2017 | Brooks et al. |
| 2017/0334784 A1 | 11/2017 | Brooks et al. |
| 2017/0335565 A1 | 11/2017 | Brooks et al. |
| 2017/0362124 A1 | 12/2017 | Sang et al. |
| 2018/0186702 A1 | 7/2018 | College et al. |
| 2018/0305257 A1 | 10/2018 | Lu et al. |
| 2018/0339944 A1 | 11/2018 | Sang et al. |
| 2018/0354857 A1 | 12/2018 | Morlat et al. |
| 2018/0370855 A1 | 12/2018 | Ironside et al. |
| 2019/0023612 A1 | 1/2019 | Sang et al. |
| 2019/0047914 A1 | 2/2019 | Xu et al. |
| 2019/0062215 A1* | 2/2019 | Lu .......................... D21H 19/34 |
| 2019/0092689 A1 | 3/2019 | Sang et al. |
| 2019/0389768 A1 | 12/2019 | Vilinska et al. |
| 2020/0024190 A1 | 1/2020 | Sang et al. |
| 2020/0024191 A1* | 1/2020 | Li .......................... C04B 11/005 |
| 2020/0148601 A1 | 5/2020 | College et al. |
| 2020/0239366 A1 | 7/2020 | Vilinska et al. |
| 2020/0262756 A1 | 8/2020 | Morlat et al. |
| 2020/0369569 A1 | 11/2020 | Brooks et al. |
| 2020/0399176 A1 | 12/2020 | Hotchin et al. |
| 2020/0399898 A1 | 12/2020 | Brooks et al. |
| 2021/0147297 A1 | 5/2021 | Sang et al. |
| 2021/0253476 A1 | 8/2021 | Sang et al. |
| 2022/0234950 A1* | 7/2022 | Fan .......................... C08L 3/18 |

* cited by examiner

METHOD OF FORMING A GYPSUM PANEL INCLUDING A STARCH LAYER

CROSS-REFERENCE TO RELATED APPLICATION

The present application claims filing benefit of U.S. Provisional Patent Application Ser. No. 63/004,047 having a filing date of Apr. 2, 2020, and which is incorporated herein by reference in its entirety.

BACKGROUND

A building is typically constructed with walls and ceilings having a frame comprising studs wherein one or more gypsum panels are fastened to the studs. For instance, for interior walls, one or more gypsum panels are fastened to each side of the studs while for exterior walls and ceilings one or more gypsum panels are generally fastened to one side of the studs. The gypsum panels are also typically provided with a facing material on at least one side of the panel. The facing material may provide a more visually appealing surface. Typically, facing materials include paper, glass mat, and/or polymer facing materials which can adhere to the gypsum panel. However, at times, such adhesion may not be as desired. For instance, when utilizing paper facing materials, the material may debond from the gypsum panel. While remedies have been provided in the art, there are still some deficiencies.

As a result, there is a need to further improve a gypsum panel and the adhesion between the gypsum panel and the facing material, in particular a paper facing material.

SUMMARY OF THE INVENTION

In accordance with one embodiment of the present invention, a method of forming a gypsum panel is disclosed. The method comprises providing a first facing material, providing a starch slurry onto the first facing material, then depositing a gypsum slurry comprising stucco and water onto the starch slurry on the first facing material, providing a second facing material on the gypsum slurry, and allowing the stucco to convert to calcium sulfate dihydrate.

In accordance with one embodiment of the present invention, a gypsum panel is disclosed. The gypsum panel is formed by providing a first facing material, providing a starch slurry onto the first facing material, then depositing a gypsum slurry comprising stucco and water onto the starch slurry layer on the first facing material, providing a second facing material on the gypsum slurry, and allowing the stucco to convert to calcium sulfate dihydrate.

BRIEF DESCRIPTION OF THE DRAWINGS

The invention will now be described, by way of example, with reference to the accompanying drawings, in which.

DETAILED DESCRIPTION

Figure 1:
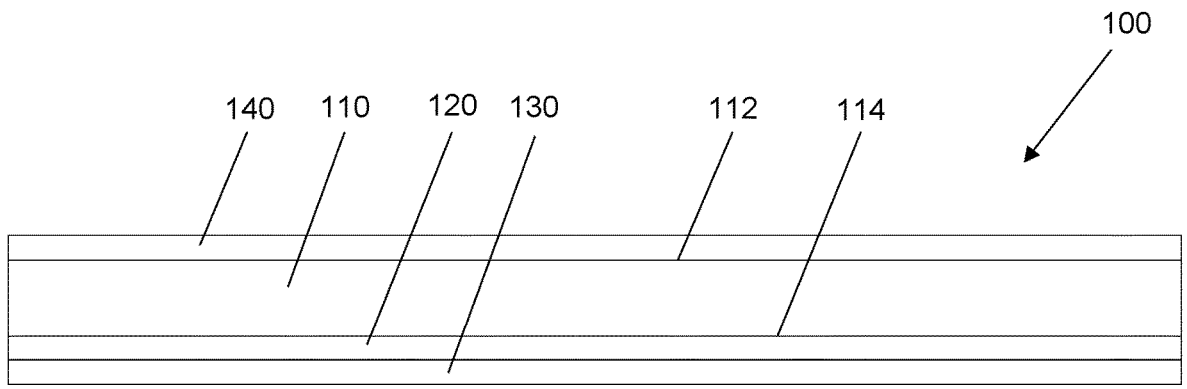
FIG. 1 is an example of one gypsum panel including an intermediate starch layer according to the present invention.

Reference now will be made in detail to embodiments, one or more examples of which are illustrated in the drawings. Each example is provided by way of explanation of the embodiments, not as a limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Generally speaking, the present invention is directed to a gypsum panel and a method of making a gypsum panel. In particular, the gypsum panel includes a gypsum core having a first gypsum layer surface and a second gypsum layer surface opposite the first gypsum layer surface and a starch layer having a first starch layer surface and a second starch layer surface opposite the first starch layer surface wherein the first starch layer surface faces the first gypsum layer surface. In addition, a facing material is provided on the second starch layer surface.

The present inventors have discovered a particular manner in which the starch layer can be provided at the facing material/gypsum core interface resulting in several advantages. In particular, the present inventors have discovered that the application of the starch layer to the interior of the facing material(s) can reduce the total amount of starch required within the core of the gypsum board for providing an adequate bond between the gypsum core and the facing material as well as an adequate interface strength. For instance, by applying the starch as disclosed herein, in comparison to a conventional approach, the amount of starch required to provide a desired bond can be at least 5% less, such as at least 10% less, such as at least 15% less, such as at least 20% less, such as at least 25% less, such as at least 30% less, such as at least 40% less, such as at least 50% less, such as at least 60% less, such as at least 70% less, such as at least 80% less.

In this regard, by utilizing the technique as disclosed herein, the present inventors have discovered that an effective bond may be realized between the facing material and the gypsum core. Typically, a humidified bond analysis is performed in a humidity chamber at 90° F. and 90% humidity. In this test, after exposure, the facing material is removed to determine how much remains on the gypsum board. The percent coverage can be determined using various optical analytical techniques. In this regard, the facing material may cover 100% or less, such as 99% or less, such as 98% or less, such as 95% or less, such as 93% or less, such as 90% or less, such as 80% or less, such as 70% or less, such as 60% or less, such as 50% or less, such as 40% or less, such as 30% or less, such as 20% or less, such as 10% or less of the surface area of the gypsum core upon conducting the test. The facing material may cover 10% or more, such as 20% or more, such as 30% or more, such as 40% or more, such as 50% or more, such as 60% or more, such as 70% or more, such as 80% or more, such as 90% or more, such as 93% or more, such as 95% or more, such as 97% or more, such as 98% or more, such as 99% or more, such as 100% of the surface area of the gypsum core upon conducting the test. In one embodiment, such percentage may be realized after 2 hours of exposure. In another embodiment, such percentage may be realized after 20 hours of exposure. In one embodiment, such percentage may be for a face of the gypsum board. Conventionally, the face may correspond to the side of the gypsum panel wherein the facing material is first provided prior to providing the gypsum slurry. In another embodiment, such percentage may be for a back of the gypsum board. Conventionally, the back may correspond to the side of the gypsum panel wherein the facing material is provided onto the gypsum slurry. Further, such percentages may apply to the face and the back of the gypsum board. In addition, in one embodiment, such percentages may be based on an average of at least 5 samples.

Regardless, as indicated herein, at least one aspect of the present invention provides a method of forming a gypsum panel. The method requires a step of providing a first facing material. The first facing material may be conveyed on a conveyor system (i.e., a continuous system for continuous manufacture of the gypsum panel).

The method also requires a step of providing a starch slurry onto the first facing material wherein the starch slurry comprises starch and water. In one embodiment, such deposition of the starch slurry may be directly onto the first facing material such that it contacts the facing material. In one embodiment, the method may also require a step of providing a starch slurry at the interface of the gypsum core and a second facing material. In this regard, the starch slurry may be applied directly to the gypsum slurry prior to providing the second facing material. Alternatively, the starch slurry may be provided directly onto the second facing material prior to providing the second facing material onto the gypsum slurry.

In one embodiment, the starch slurry is provided such that it covers at least 50%, such as at least 60%, such as at least 70%, such as at least 75%, such as at least 80%, such as at least 85%, such as at least 90%, such as at least 93%, such as at least 95%, such as at least 97%, such as at least 98%, such as at least 99%, such as 100% of the area of the deposition surface, such as the first facing material. In one embodiment, the starch slurry is provided such that it covers 100% or less, such as 99% or less, such as 98% or less, such as 97% or less, such as 95% or less, such as 90% or less of the area of the deposition surface, such as the first facing material. When the starch slurry is also applied to the second facing material, the aforementioned percentages may also apply to the application of the starch slurry to such facing material.

In one embodiment, the starch may be provided to form a continuous layer. For instance, in one embodiment, the starch may be provided such that it does not necessarily form a pattern.

As indicated herein, the starch slurry includes at least one starch. In one embodiment, the starch slurry may include at least two starches. In a further embodiment, the starch slurry may include at least three starches. In general, a starch is a polymeric carbohydrate including glucose units joined by glycosidic bonds. In this regard, the source of the starch is not necessarily limited and may include those generally known in the art such as, but not limited to, corn starch, wheat starch, rice starch, or a mixture thereof.

In one embodiment, the starch is a non-migratory starch. For instance, the starch may not be acid-modified. In another embodiment, the starch is a migratory starch, such that it is acid-modified. In a further embodiment, the starch may include a mixture of a non-migratory starch and a migratory starch. When present as a mixture, each starch may be present in an amount of 5 wt. % or more, such as 10 wt. % or more, such as 20 wt. % or more, such as 30 wt. % or more, such as 40 wt. % or more, such as 50 wt. % or more, such as 60 wt. % or more, such as 70 wt. % or more, such as 80 wt. % or more based on the total weight of the starches. In addition, each starch may be present in an amount of less than 100 wt. %, such as 95 wt. % or less, such as 90 wt. % or less, such as 80 wt. % or less, such as 70 wt. % or less, such as 60 wt. % or less, such as 50 wt. % or less, such as 40 wt. % or less, such as 30 wt. % or less, such as 20 wt. % or less, such as 10 wt. % or less based on the total weight of the starches.

In one embodiment, the starch may be a non-pregelatinized starch. In another embodiment, the starch may be a pregelatinized starch. For example, the starch may be a pregelatinized corn starch, a pregelatinized rice starch, a pregelatinized wheat starch, or a mixture thereof.

The starch may have a peak viscosity of 50 BU or more, such as 100 BU or more, such as 150 BU or more, such as 100 BU or more, such as 200 BU or more, such as 100 BU or more, such as 300 BU or more, such as 100 BU or more, such as 400 BU or more, such as 100 BU or more, such as 500 BU or more, such as 100 BU or more, such as 700 BU or more, such as 100 BU or more, such as 1,000 BU or more, such as 100 BU or more. The starch may have a peak viscosity of 5,000 BU or less, such as 4,000 BU or less, such as 3,000 BU or less, such as 2,000 BU or less, such as 1,800 BU or less, such as 1,500 BU or less, such as 1,300 BU or less, such as 1,000 BU or less.

The starch gelling temperature (i.e., the temperature at which the starch gels and reaches its maximum viscosity) may be reduced by chemically modifying the starch. For example, the hydroxyl groups on the starch may be replaced with other groups to reduce hydrogen bonding between the starch molecules. This may result in ethylation, ethoxylation, propoxylation, or acetylation. In one particular embodiment, the hydroxyl groups may be at least partially replaced by ethylene oxide. The starch as utilized herein may have a peak gelling temperature of 120° F. or more, such as 130° F. or more, such as 140° F. or more, such as 150° F. or more, such as 160° F. or more. The starch may have a peak gelling temperature of 200° F. or less, such as 190° F. or less, such as 180° F. or less, such as 170° F. or less, such as 165° F. or less, such as 160° F. or less. In one embodiment, the chemical modification may also be combined with acid modification to adjust the starch viscosity.

The starch slurry may include starch in an amount of 0.1 wt. % or more, such as 0.2 wt. % or more, such as 0.3 wt. % or more, such as 0.5 wt. % or more, such as 1 wt. % or more, such as 1.5 wt. % or more, such as 2 wt. % or more, such as 2.5 wt. % or more, such as 3 wt. % or more, such as 5 wt. % or more, such as 8 wt. % or more, such as 10 wt. % or more, such as 15 wt. % or more, such as 20 wt. % or more, such as 30 wt. % or more, such as 40 wt. % or more based on the weight of the starch slurry. The starch slurry may include starch in an amount of 75 wt. % or less, such as 60 wt. % or less, such as 50 wt. % or less, such as 40 wt. % or less, such as 30 wt. % or less, such as 25 wt. % or less, such as 20 wt. % or less, such as 15 wt. % or less, such as 13 wt. % or less, such as 10 wt. % or less, such as 9 wt. % or less, such as 7 wt. % or less, such as 5 wt. % or less, such as 4 wt. % or less, such as 3 wt. % or less based on the weight of the starch slurry.

The starch slurry may include starch in an amount of 50 wt. % or more, such as 60 wt. % or more, such as 70 wt. % or more, such as 80 wt. % or more, such as 90 wt. % or more, such as 95 wt. % or more, such as 98 wt. % or more, such as 99 wt. % or more, such as 100 wt. % based on the solids content of the starch slurry. The starch may be present in an amount of 100 wt. % or less, such as 98 wt. % or less, such as 95 wt. % or less, such as 90 wt. % or less, such as 85 wt. % or less, such as 80 wt. % or less, such as 70 wt. % or less, such as 60 wt. % or less based on the solids content of the starch slurry. In this regard, the resulting starch layer may include starch in an amount of 50 wt. % or more, such as 60 wt. % or more, such as 70 wt. % or more, such as 80 wt. % or more, such as 90 wt. % or more, such as 95 wt. % or more, such as 98 wt. % or more, such as 99 wt. % or more, such as 100 wt. % based on the weight of the starch layer. The starch may be present in an amount of 100 wt. % or less, such as 98 wt. % or less, such as 95 wt. % or less, such as 90 wt. % or less, such as 85 wt. % or less, such as 80 wt. % or less, such as 70 wt. % or less, such as 60 wt. % or less based on the weight of the starch layer.

In one embodiment, the starch slurry may also include gypsum. The gypsum may be an uncalcined gypsum in one embodiment. In such embodiment, the uncalcined gypsum may be natural gypsum, synthetic gypsum, or a mixture thereof. In another embodiment, the gypsum may be a calcined gypsum. The calcined gypsum may be based on natural gypsum, synthetic gypsum, or a mixture thereof. When present, the gypsum may be used in an amount of 0.1 wt. % or more, such as 0.2 wt. % or more, such as 0.3 wt. % or more, such as 0.5 wt. % or more, such as 1 wt. % or more, such as 1.5 wt. % or more, such as 2 wt. % or more, such as 2.5 wt. % or more, such as 3 wt. % or more, such as 5 wt. % or more, such as 8 wt. % or more, such as 10 wt. % or more, such as 15 wt. % or more, such as 20 wt. % or more or starch based on the weight of the starch slurry. The starch slurry may include gypsum in an amount of 50 wt. % or less, such as 40 wt. % or less, such as 30 wt. % or less, such as 25 wt. % or less, such as 20 wt. % or less, such as 15 wt. % or less, such as 13 wt. % or less, such as 10 wt. % or less, such as 9 wt. % or less, such as 7 wt. % or less, such as 5 wt. % or less, such as 4 wt. % or less, such as 3 wt. % or less based on the weight of the starch slurry. In this regard, the resulting starch layer may include gypsum in an amount of 0 wt. % or more, such as 1 wt. % or more, such as 2 wt. % or more, such as 5 wt. % or more, such as 10 wt. % or more, such as 20 wt. % or more, such as 30 wt. % or more, such as 40 wt. % or more, such as 50 wt. % or more, such as 60 wt. % or more, such as 70 wt. % or more, such as 80 wt. % or more, such as 90 wt. % or more based on the weight of the starch layer. The gypsum may be present in an amount of less than 100 wt. % or less, such as 98 wt. % or less, such as 95 wt. % or less, such as 90 wt. % or less, such as 80 wt. % or less, such as 70 wt. % or less, such as 60 wt. % or less, such as 50 wt. % or less, such as 40 wt. % or less, such as 30 wt. % or less, such as 20 wt. % or less, such as 10 wt. % or less, such as 5 wt. % or less, such as based on the weight of the starch layer.

The gypsum to starch weight ratio in the starch slurry (and resulting starch layer) may be 0.001 or more, such as 0.005 or more, such as 0.01 or more, such as 0.02 or more, such as 0.05 or more, such as 0.1 or more, such as 0.2 or more, such as 0.25 or more, such as 0.5 or more, such as 0.75 or more, such as 1 or more, such as 1.25 or more, such as 1.5 or more, such as 2 or more, such as 3 or more, such as 4 or more, such as 5 or more, such as 7 or more, such as 10 or more. The gypsum to starch weight ratio in the starch slurry (and resulting starch layer) may be 100 or less, such as 90 or less, such as 80 or less, such as 70 or less, such as 60 or less, such as 50 or less, such as 40 or less, such as 30 or less, such as 20 or less, such as 15 or less, such as 10 or less, such as 9 or less, such as 8 or less, such as 7 or less, such as 6 or less, such as 5 or less, such as 4 or less, such as 3 or less, such as 2.5 or less, such as 2 or less, such as 1 or less.

Furthermore, the starch slurry may also include other additives. These additives may include, but are not limited to, any of those additives that may also be utilized within the gypsum core. In particular, these additives may include those to enhance or improve the bond strength between the gypsum core and the facing material. For example, without intending to be limited, these additives may include sugars, starches, and/or inorganic polymers. In general, when present, each additive may be present in the starch slurry in an amount of 0.0001 wt. % or more, such as 0.001 wt. % or more, such as 0.01 wt. % or more, such as 0.02 wt. % or more, such as 0.05 wt. % or more, such as 0.1 wt. % or more, such as 0.15 wt. % or more, such as 0.2 wt. % or more, such as 0.25 wt. % or more, such as 0.3 wt. % or more, such as 0.5 wt. % or more, such as 1 wt. % or more, such as 2 wt. % or more based on the weight of the slurry. The additive may be present in an amount of 20 wt. % or less, such as 15 wt. % or less, 10 wt. % or less, such as 7 wt. % or less, such as 5 wt. % or less, such as 4 wt. % or less, such as 3 wt. % or less, such as 2.5 wt. % or less, such as 2 wt. % or less, such as 1.8 wt. % or less, such as 1.5 wt. % or less, such as 1 wt. % or less, such as 0.8 wt. % or less, such as 0.6 wt. % or less, such as 0.5 wt. % or less, such as 0.4 wt. % or less, such as 0.35 wt. % or less, such as 0.2 wt. % or less based on the weight of the slurry.

In one embodiment, the starch slurry may be prepared according to a particular method. In general, the starch and water, as well as any other additives, may be combined prior to providing it for manufacture of the gypsum panel. In this regard, in one embodiment, the starch slurry may be prepared by combining water and starch. In one embodiment, when combining the starch with the water, the starch may be provided as a dry starch, for instance without a liquid such as water. In another embodiment, the starch may be a wet starch. For instance, as a wet starch, the starch may already be provided with a certain amount of water.

In addition, when combining, the starch and water may undergo relatively high shear. The present inventors have discovered that such high shear can assist with breaking apart the starch such that it is more effective for forming an adequate bond at the facing material/gypsum core interface.

In one embodiment, such shear may be provided in a mixer. The mixer may be a disperser. In this regard, such mixer, or disperser, may be one that can operate at high shear. In general, the mixer can disperse the starch and or other additives, such as gypsum, into the liquid, such as the water, flowing through it to produce a liquid containing dispersed solids. In general, the liquid enters the mixer, or disperser, via one inlet and the starch enters via a second inlet. If additives are utilized, they may also enter through the inlet with the starch. Alternatively or in addition, the additives may enter via the inlet with the water. Alternatively or in addition, the additives may enter via a third inlet. Furthermore, the starch may be fed to the mixer or disperser using a feeder, such as an auger feeder or a gravity-flow hopper.

In order to have consistent addition of solids into the mixer, a reduced pressure may be required. For instance, the liquid, such as the water, may be above atmospheric pressure when entering the mixer and thus create a low pressure zone (sub atmospheric), which can create a suction for the solid feed through the inlet. While not necessarily limited, there may be a pressure differential of less than 200 kPa, such as less than 190 kPa, such as less than 180 kPa, such as less than 170 kPa, such as less than 160 kPa, such as less than 150 kPa, such as less than 130 kPa, such as less than 110 kPa, such as less than 100 kPa.

In general, as indicated above, a chamber or mixing vessel is in communication with the inlets and the outlet of the mixer. The chamber may contain a mixing implement to mix the solids, such as the starch, with the liquid. For example, the mixing device may include an impeller. The mixing implement may include a rotor and stator.

Once combined, the mixture including the water and starch may undergo relatively high shear. For example, the shear may be 3,000 rpm or more, such as 3,500 rpm or more, such as 4,000 rpm or more, such as 4,500 rpm or more, such as 5,000 rpm or more, such as 6,000 rpm or more, such as 7,500 rpm or more. The shear may be 20,000 rpm or less, such as 18,000 rpm or less, such as 15,000 rpm or less, such as 13,000 rpm or less, such as 11,000 rpm or less, such as 10,000 rpm or less, such as 9,000 rpm or less, such as 8,000 rpm or less, such as 7,000 rpm or less, such as 6,000 rpm or less. Such shear may allow for the formation of a relatively homogeneous dispersion.

Once adequately mixed, the starch slurry may be provided onto the first facing material. The method in which it may be applied is not necessarily limited. For instance, in one embodiment, the starch slurry may be provided onto a roll coater such that it is roll coated onto the first facing material. In one embodiment, the starch slurry may be sprayed onto the first facing material. In a further embodiment, the starch slurry may be roll coated and sprayed onto the first facing material.

After providing the starch slurry, the method further comprises a step of depositing a gypsum slurry comprising stucco and water onto the layer of starch slurry. In one embodiment, such deposition of the gypsum slurry may be directly onto the starch slurry such that it contacts the starch slurry. The method may also include a step of combining stucco and water prior to forming the gypsum slurry, in particular prior to depositing the gypsum slurry. In general, stucco may be referred to as calcined gypsum or calcium sulfate hemihydrate. The calcined gypsum may be from a natural source or a synthetic source and is thus not necessarily limited by the present invention. In addition to the stucco, the gypsum slurry may also contain some calcium sulfate dihydrate or calcium sulfate anhydrite. If calcium sulfate dihydrate is present, the calcium sulfate hemihydrate may be present in an amount of at least 50 wt. %, such as at least 60 wt. %, such as at least 70 wt. %, such as at least 80 wt. %, such as at least 85 wt. %, such as at least 90 wt. %, such as at least 95 wt. %, such as at least 98 wt. %, such as at least 99 wt. % based on the weight of the calcium sulfate hemihydrate and the calcium sulfate dihydrate. Furthermore, the calcined gypsum may be α-hemihydrate, β-hemihydrate, or a mixture thereof.

In addition to the stucco, the gypsum slurry may also contain other hydraulic materials, which may also be present in the gypsum core. These hydraulic materials may include calcium sulfate anhydrite, land plaster, cement, fly ash, or any combinations thereof. When present, they may be utilized in an amount of 30 wt. % or less, such as 25 wt. % or less, such as 20 wt. % or less, such as 15 wt. % or less, such as 10 wt. % or less, such as 8 wt. % or less, such as 5 wt. % or less based on the total content of the hydraulic material.

As indicated above, the gypsum slurry also includes water. Water may be employed for fluidity and also for rehydration of the stucco to allow for setting. The amount of water utilized is not necessarily limited by the present invention.

For instance, the weight ratio of the water to the stucco may be 0.1 or more, such as 0.2 or more, such as 0.3 or more, such as 0.4 or more, such as 0.5 or more. The weight ratio of the water to the stucco may be 4 or less, such as 3.5 or less, such as 3 or less, such as 2.5 or less, such as 2 or less, such as 1.7 or less, such as 1.5 or less, such as 1.4 or less, such as 1.3 or less, such as 1.2 or less, such as 1.1 or less, such as 1 or less, such as 0.9 or less, such as 0.85 or less, such as 0.8 or less, such as 0.75 or less, such as 0.7 or less, such as 0.6 or less, such as 0.5 or less, such as 0.4 or less, such as 0.35 or less, such as 0.3 or less, such as 0.25 or less, such as 0.2 or less.

In addition to the stucco and water, the gypsum slurry may also include any other conventional additives as known in the art. Accordingly, these conventional additives may also be present in the gypsum core. In this regard, such additives are not necessarily limited by the present invention. For instance, the additives may include dispersants, foam or foaming agents including aqueous foam (e.g. surfactants), set accelerators (e.g., BMA, land plaster, sulfate salts, etc.), set retarders, binders, biocides (such as bactericides and/or fungicides), adhesives, pH adjusters, thickeners (e.g., silica fume, Portland cement, fly ash, clay, celluloses, high molecular weight polymers, etc.), leveling agents, non-leveling agents, starches (such as pregelatinized starch, non-pregelatinized starch, and/or an acid modified starch), colorants, fire retardants or additives (e.g., silica, silicates, expandable materials such as vermiculite, perlite, etc.), water repellants, fillers (e.g., glass fibers), waxes, secondary phosphates (e.g., condensed phosphates or orthophosphates including trimetaphosphates, polyphosphates, and/or cyclo-phosphates, etc.), sound dampening polymers (e.g., viscoelastic polymers), natural and synthetic polymers, etc. In general, it should be understood that the types and amounts of such additives are not necessarily limited by the present invention.

In one embodiment, the additive may include at least a starch. In one embodiment, the starch may be a pregelatinized starch. In another embodiment, the starch may be a non-pregelatinized starch. In a further embodiment, the starch may be an acid modified starch. Furthermore, it should be understood that the starch may be any starch disclosed herein for utilization in the starch slurry and corresponding starch layer.

In general, when present, each additive may be present in the gypsum slurry in an amount of 0.0001 wt. % or more, such as 0.001 wt. % or more, such as 0.01 wt. % or more, such as 0.02 wt. % or more, such as 0.05 wt. % or more, such as 0.1 wt. % or more, such as 0.15 wt. % or more, such as 0.2 wt. % or more, such as 0.25 wt. % or more, such as 0.3 wt. % or more, such as 0.5 wt. % or more, such as 1 wt. % or more, such as 2 wt. % or more based on the weight of the stucco. The additive may be present in an amount of 20 wt. % or less, such as 15 wt. % or less, 10 wt. % or less, such as 7 wt. % or less, such as 5 wt. % or less, such as 4 wt. % or less, such as 3 wt. % or less, such as 2.5 wt. % or less, such as 2 wt. % or less, such as 1.8 wt. % or less, such as 1.5 wt. % or less, such as 1 wt. % or less, such as 0.8 wt. % or less, such as 0.6 wt. % or less, such as 0.5 wt. % or less, such as 0.4 wt. % or less, such as 0.35 wt. % or less, such as 0.2 wt. % or less based on the weight of the stucco.

The manner in which the gypsum, water, and any optional additives are combined is not necessarily limited. For instance, the gypsum slurry can be made using any method or device generally known in the art. In particular, the components of the slurry can be mixed or combined using any method or device generally known in the art. For instance, the components of the gypsum slurry may be combined in any type of device, such as a mixer and in particular a pin mixer.

Furthermore, in one embodiment, the gypsum slurry may be deposited in one step for forming the gypsum core. In another embodiment, the gypsum slurry may be deposited in two steps for forming the gypsum core. For example, a first gypsum slurry may be deposited followed by a second gypsum slurry. The first gypsum slurry and the second gypsum slurry may have the same composition except that the second gypsum slurry may include a foaming agent. In this regard, the first gypsum slurry may not include a foaming agent. Accordingly, the first gypsum slurry may result in a dense gypsum layer, in particular, a non-foamed gypsum layer. Accordingly, such gypsum layer may have a density greater than the gypsum layer formed from the second gypsum slurry, or foamed gypsum layer.

In a further embodiment, the gypsum core may be formed using a third gypsum slurry that may not include a foaming agent. The third gypsum slurry may have the same composition as the first gypsum slurry. In this regard, the gypsum core may include at least two non-foamed gypsum layers.

The first (or non-foamed) gypsum layer may have a thickness that is 0.5% or more, such as 1% or more, such as 2% or more, such as 3% or more, such as 4% or more, such as 5% or more, such as 10% or more, such as 15% or more the thickness of the second (or foamed) gypsum layer. The thickness may be 80% or less, such as 60% or less, such as 50% or less, such as 40% or less, such as 30% or less, such as 25% or less, such as 20% or less, such as 15% or less, such as 10% or less, such as 8% or less, such as 5% or less the thickness of the second (or foamed) gypsum layer.

The density of the second (or foamed) gypsum layer may be 0.5% or more, such as 1% or more, such as 2% or more, such as 3% or more, such as 4% or more, such as 5% or more, such as 10% or more, such as 15% or more the density of the first (or non-foamed) gypsum layer. The density of the second (or foamed) gypsum layer may be 80% or less, such as 60% or less, such as 50% or less, such as 40% or less, such as 30% or less, such as 25% or less, such as 20% or less, such as 15% or less, such as 10% or less, such as 8% or less, such as 5% or less the density of the first (or non-foamed) gypsum layer.

Next, after depositing the gypsum slurry, After deposition of the gypsum slurry, the method further comprises a step of providing a second facing material on the gypsum slurry such that the gypsum slurry is sandwiched in order to form the gypsum panel. In one embodiment, such deposition of the second facing material may be directly onto the gypsum slurry such that it contacts the gypsum slurry.

However, in another embodiment, the second facing material may be indirectly placed on the gypsum slurry. For instance, the method may include a step of providing an intermediate layer between the gypsum slurry and the second facing material. In one embodiment, such intermediate layer may be formed by providing a starch slurry, such as the one mentioned herein, onto the gypsum slurry. Alternatively, the starch slurry may be provided on the second facing material which is then provided onto the gypsum slurry. Regardless, the starch slurry and corresponding starch layer may be at the gypsum core/second facing material interface. Furthermore, reference to the properties related to the application of the starch slurry to the first facing material as provided herein may also apply to the application of the starch slurry to the second facing material or at the interface of the gypsum ore and the second facing material.

Regardless of the configuration, after deposition of the gypsum slurry, the calcium sulfate hemihydrate reacts with the water to convert the calcium sulfate hemihydrate into a matrix of calcium sulfate dihydrate. Such reaction may allow for the gypsum to set and become firm thereby allowing for the continuous sheet to be cut into gypsum panels at the desired length. In this regard, the method may comprise a step of reacting calcium sulfate hemihydrate with water to form calcium sulfate dihydrate or allowing the calcium sulfate hemihydrate to convert to calcium sulfate dihydrate. In this regard, the method may allow for the slurry to set to form a gypsum panel.

The method may also comprise a step of cutting a continuous gypsum sheet into a gypsum panel. Then, after the cutting step, the method may comprise a step of supplying the gypsum panel to a heating device or drying device. For instance, such heating device may be a kiln and may allow for removal of any free water. The temperature and time required for heating in such heating device are not necessarily limited by the present invention.

As indicated above, in general, the present invention is also directed to a gypsum panel. The gypsum panel may be made according to the method mentioned herein. Furthermore, the gypsum panel includes a gypsum core. In general, the composition of the gypsum core is not necessarily limited and may be any gypsum core generally known in the art. Regardless, the gypsum core is typically made from a gypsum slurry including at least stucco and water.

In general, the gypsum core has a first gypsum layer surface and a second gypsum layer surface opposite the first gypsum layer surface. As indicated herein, the gypsum panel also includes a starch layer. The starch layer includes starch. The starch layer may also include gypsum and, optionally, other additives. In this regard, the starch layer may be disposed on a gypsum layer surface. For instance, in one embodiment, the starch layer may be disposed on the first gypsum layer surface. In another embodiment, the starch layer may also be disposed on the second gypsum layer surface.

Further, the starch layer may have a first starch layer surface and a second starch layer surface opposite the first starch layer surface. The first starch layer surface faces the first gypsum layer surface. In addition, a facing material is provided on the second starch layer surface. When the gypsum panel only includes one starch layer on the first gypsum layer surface, a facing material as disclosed herein may be disposed on the other gypsum layer surface.

The first facing material as described herein may be any facing material as generally employed in the art. For instance, the facing material may be a paper (or other cellulosic material), a fibrous (e.g., glass fiber) mat facing material, a scrim faming material, or a polymeric facing material. In one embodiment, the facing material is a paper facing material. In another embodiment, the facing material is a glass mat facing material. In a further embodiment, the facing material is a scrim facing material. In another further embodiment, the facing material is a polymeric facing material.

The second facing material as described herein may be any facing material as generally employed in the art. For instance, the facing material may be a paper (or other cellulosic material), a fibrous (e.g., glass fiber) mat facing material, a scrim faming material, or a polymeric facing material. In one embodiment, the facing material is a paper facing material. In another embodiment, the facing material is a glass mat facing material. In a further embodiment, the facing material is a scrim facing material. In another further embodiment, the facing material is a polymeric facing material.

It should be understood that the facing materials employed in the gypsum panel may be all of the same type of material. Alternatively, it should be understood that the facing materials employed in the gypsum panel may be of different types of materials. For instance, the second facing material may be a paper facing material in one embodiment. In another embodiment, such facing material may be a glass fiber mat facing material.

The thickness of the first and/or second facing materials is not necessarily limited. For instance, the thickness may be 0.01 mm or more, such as 0.05 mm or more, such as 0.1 mm or more, such as 0.2 mm or more, such as 0.25 mm or more, such as 0.3 mm or more, such as 0.5 mm or more, such as 1 mm or more, such as 2 mm or more, such as 3 mm or more, such as 5 mm or more, such as 7 mm or more, such as 9 mm or more, such as 10 mm or more. The thickness may be 50 mm or less, such as 40 mm or less, such as 30 mm or less, such as 25 mm or less, such as 20 mm or less, such as 18 mm or less, such as 15 mm or less, such as 14 mm or less, such as 13 mm or less, such as 12 mm or less, such as 11 mm or less, such as 10 mm or less, such as 9 mm or less, such as 8 mm or less, such as 7 mm or less, such as 6 mm or less, such as 5 mm or less, such as 4 mm or less, such as 3 mm or less, such as 2 mm or less, such as 1 mm or less, such as 0.8 mm or less, such as 0.6 mm or less, such as 0.5 mm or less, such as 0.4 mm or less, such as 0.3 mm or less, such as 0.2 mm or less.

One example of a gypsum panel as disclosed herein is illustrated in FIG. 1. In FIG. 1, the gypsum panel 100 includes a gypsum core 110 having a first gypsum layer surface 112 and a second gypsum layer surface 114. A starch layer 120 is provided on the first gypsum layer surface 112. A first facing material 130 is provided on the starch layer 120. A second facing material 140 is provided on the second gypsum layer surface.

Figure 2:
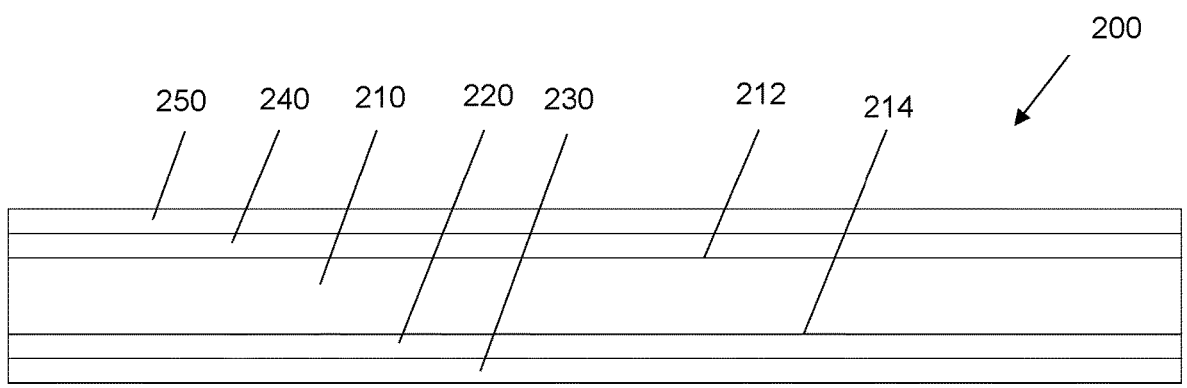
FIG. 2 is an example of another gypsum panel including two intermediate starch layers according to the present invention.

Another example of a gypsum panel as disclosed herein is illustrated in FIG. 2. In FIG. 2, the gypsum panel 200 includes a gypsum core 210 having a first gypsum layer surface 212 and a second gypsum layer surface 214. A starch layer 220 is provided on the first gypsum layer surface 212. A first facing material 230 is provided on the starch layer 220. A starch layer 250 is also provided on the second gypsum layer surface. A second facing material 240 is provided on the starch layer.

The gypsum panel disclosed herein may have many applications. For instance, the gypsum panel may be used as a standalone panel in construction for the preparation of walls, ceilings, floors, etc. In addition, the gypsum panel may be installed on an existing or installed gypsum panel. As used in the present disclosure, the term "gypsum panel," generally refers to any panel, sheet, or planar structure, either uniform or formed by connected portions or pieces, that is constructed to at least partially establish one or more physical boundaries. Such existing, installed, or otherwise established or installed wall or ceiling structures comprise materials that may include, as non-limiting examples, gypsum, stone, ceramic, cement, wood, composite, or metal materials. The installed gypsum panel forms part of a building structure, such as a wall or ceiling. The gypsum panel may have desirable properties and/or characteristics.

The thickness of the gypsum panel, and in particular, the gypsum core, is not necessarily limited and may be from about 0.25 inches to about 1 inch. For instance, the thickness may be at least ¼ inches, such as at least ⁵⁄₁₆ inches, such as at least ⅜ inches, such as at least ½ inches, such as at least ⅝ inches, such as at least ¾ inches, such as at least 1 inch, such as at least 1.5 inches, such as at least 2 inches. In this regard, the thickness may be about any one of the aforementioned values. For instance, the thickness may be about ¼ inches. Alternatively, the thickness may be about ⅜ inches. In another embodiment, the thickness may be about ½ inches. In a further embodiment, the thickness may be about ⅝ inches. In another further embodiment, thickness may be about 1 inch. With regard to the thickness, the term "about" may be defined as within 10%, such as within 5%, such as within 4%, such as within 3%, such as within 2%, such as within 1%.

The weight of the gypsum panel is not necessarily limited. For instance, the gypsum panel may have a weight of 500 lbs/MSF or more, such as about 600 lbs/MSF or more, such as about 700 lbs/MSF or more, such as about 800 lbs/MSF or more, such as about 900 lbs/MSF or more, such as about 1000 lbs/MSF or more, such as about 1100 lbs/MSF or more, such as about 1200 lbs/MSF or more, such as about 1300 lbs/MSF or more, such as about 1350 lbs/MSF or more, such as about 1400 lbs/MSF or more, such as about 1450 lbs/MSF or more, such as about 1500 lbs/MSF or more. The weight may be about 4000 lbs/MSF or less, such as about 3000 lbs/MSF or less, such as about 2500 lbs/MSF or less, such as about 2000 lbs/MSF or less, such as about 1800 lbs/MSF or less, such as about 1600 lbs/MSF or less, such as about 1500 lbs/MSF or less, such as about 1450 lbs/MSF or less, such as about 1400 lbs/MSF or less, such as about 1350 lbs/MSF or less, such as about 1300 lbs/MSF or less, such as about 1200 lbs/MSF or less. Such weight may be a dry weight such as after the panel leaves the heating device (e.g., kiln).

In addition, the gypsum panel may have a density of about 5 pcf or more, such as about 10 pcf or more, such as about 15 pcf or more, such as about 20 pcf or more. The gypsum panel may have a density of about 60 pcf or less, such as about 50 pcf or less, such as about 40 pcf or less, such as about 35 pcf or less, such as about 33 pcf or less, such as about 30 pcf or less, such as about 28 pcf or less, such as about 25 pcf or less, such as about 23 pcf or less, such as about 20 pcf or less.

The gypsum panel may have a certain nail pull resistance, which generally is a measure of the force required to pull a gypsum panel off of a wall by forcing a fastening nail through the panel. The values obtained from the nail pull test generally indicate the maximum stress achieved while the fastener head penetrates through the panel surface and core. In this regard, the gypsum panel exhibits a nail pull resistance of at least about 25 $lb_f$, such as at least about 30 $lb_f$, such as at least about 35 $lb_f$, such as at least about 40 $lb_f$, such as at least about 45 $lb_f$, such as at least about 50 $lb_f$, such as at least about 55 $lb_f$, such as at least about 60 $lb_f$, such as at least about 65 $lb_f$, such as at least about 70 $lb_f$, such as at least about 75 $lb_f$, such as at least about 77 $lb_f$, such as at least about 80 $lb_f$, such as at least about 85 $lb_f$, such as at least about 90 $lb_f$, such as at least about 95 $lb_f$, such as at least about 100 $lb_f$ as tested according to ASTM C1396. The nail pull resistance may be about 150 $lb_f$ or less, such as about 140 $lb_f$ or less, such as about 130 $lb_f$ or less, such as about 120 $lb_f$ or less, such as about 110 $lb_f$ or less, such as about 105 $lb_f$ or less, such as about 100 $lb_f$ or less, such as about 95 $lb_f$ or less, such as about 90 $lb_f$ or less, such as about 85 $lb_f$ or less, such as about 80 $lb_f$ or less as tested according to ASTM C1396. Such nail pull resistance may be based upon the thickness of the gypsum panel. For instance, when conducting a test, such nail pull resistance values may vary depending on the thickness of the gypsum panel. As an example, the nail pull resistance values above may be for a ⅝ inch gypsum panel. However, it should be understood that instead of a ⅝ inch gypsum panel, such nail pull resistance values may be for any other thickness gypsum panel as mentioned herein. For instance, such nail pull resistance values may be for a ¼ inch gypsum panel, a ½ gypsum panel, a ¾ inch gypsum panel, a 1 inch gypsum panel, etc.

The gypsum panel may have a certain compressive strength. For instance, the compressive strength may be about 150 psi or more, such as about 200 psi or more, such as about 250 psi or more, such as about 300 psi or more, such as about 350 psi or more, such as about 375 psi or more, such as about 400 psi or more, such as about 500 psi or more as tested according to ASTM C473. The compressive strength may be about 3000 psi or less, such as about 2500 psi or less, such as about 2000 psi or less, such as about 1700 psi or less, such as about 1500 psi or less, such as about 1300 psi or less, such as about 1100 psi or less, such as about 1000 psi or less, such as about 900 psi or less, such as about 800 psi or less, such as about 700 psi or less, such as about 600 psi or less, such as about 500 psi or less. Such compressive strength may be based upon the thickness of the gypsum panel. For instance, when conducting a test, such compressive strength values may vary depending on the thickness of the gypsum panel. As an example, the compressive strength values above may be for a 5/8 inch gypsum panel. However, it should be understood that instead of a 5/8 inch gypsum panel, such compressive strength values may be for any other thickness gypsum panel as mentioned herein. For instance, such compressive strength values may be for a 1/4 inch gypsum panel, a 1/2 gypsum panel, a 3/4 inch gypsum panel, a 1 inch gypsum panel, etc.

In addition, the gypsum panel may have a core hardness of at least about 8 $lb_f$, such as at least about 10 $lb_f$, such as at least about 11 $lb_f$, such as at least about 12 $lb_f$, such as at least about 15 $lb_f$, such as at least about 18 $lb_f$, such as at least about 20 $lb_f$ as tested according to ASTM C1396. The gypsum panel may have a core hardness of 50 $lb_f$ or less, such as about 40 $lb_f$ or less, such as about 35 $lb_f$ or less, such as about 30 $lb_f$ or less, such as about 25 $lb_f$ or less, such as about 20 $lb_f$ or less, such as about 18 $lb_f$ or less, such as about 15 $lb_f$ or less as tested according to ASTM C1396. In addition, the gypsum panel may have an end hardness according to the aforementioned values. Further, the gypsum panel may have an edge hardness according to the aforementioned values. Such hardness values may be based upon the thickness of the gypsum panel. For instance, when conducting a test, such hardness values may vary depending on the thickness of the gypsum panel. As an example, the hardness values above may be for a 5/8 inch gypsum panel. However, it should be understood that instead of a 5/8 inch gypsum panel, such hardness values may be for any other thickness gypsum panel as mentioned herein. For instance, such hardness values may be for a 1/4 inch gypsum panel, a 1/2 gypsum panel, a 3/4 inch gypsum panel, a 1 inch gypsum panel, etc.

EXAMPLES

Test Methods

Nail pull: The nail pull is determined in accordance with ASTM C1396 and ASTM C473. For this test, the specimens are conditioned from 70° F. to 100° F., in particular 70° F., and 50%+/−2% relative humidity for at least 24 hours, positioned so they do not warp. The moisture meter reading should be between 10-20 at the time of testing. The reported value is the average of five specimens.

Humidified Bond: A humidified bond analysis is performed utilizing 12" by 12" specimens of the gypsum panel. The specimens are placed on edge in a humidity chamber at 90° F. and 90% humidity with faces 2+/−1/4 inches apart. As reported below, the exposure was for either 2 hours or 20 hours. The specimens should have a moisture meter reading of 50+ upon completion of the humidification. Immediately, the specimens were analyzed to determine the bond. First, score lines should be scribed across the full width of the sample at 4" from one edge on the face and 4" in from the opposite edge on the back wherein the score lines are parallel to one another and perpendicular to the direction of machine travel. Next, firmly hold the specimen on a bench top and while face up, break the core along a score line and leave the paper intact on the side to be evaluated. Holding each portion of the specimen in separate hands and having the exposed broken core in a line of vision, exert a pulling force on one half of the specimen while holding the other half in a steady position in order to peel or tear the paper away from the core. Continue the pulling force until the paper peels away from the core to the maximum extent possible. Repeat this pulling action for the companion portion of the specimen. Then, repeat both steps for the back of the specimen. Next, determine the bond failure area where the facing material is removed from the gypsum core, with 100% indicative of no paper to gypsum core bond and 0% indicative of no paper to core failure (i.e. full paper bond to the core). The percent coverage can be determined using various optical/visual analytical techniques.

Dry Bond: The effectiveness of the adhesion of the facing material to the gypsum core is determined by determining the dry bond after the panel has progressed through the drying kiln. The dry bond test is carried out in the same manner as humidified bond except the board is conditioned by draying in an oven at 45° C. until a constant weight is obtained. The test results are given in terms of percentage of bond failure, with 100% indicative of no paper to gypsum core bond and 0% indicative of no paper to core failure (i.e. full paper bond to the core).

End Peel: This test allows for the quantification of the degree of paper-to-core bond failure at the ends of the gypsum panel. To perform the test, the face paper at the board end is grasped with a thumb and index finger, the thumbnail is inserted into the board core at the end (to take a "bite" of core), and the face paper is peeled back in the machine direction (i.e., perpendicular to the width) until it tears through the topliner paper ply. The procedure is repeated at approximately 12 inches, 24 inches, and 36 inches across the width of the board, on both the front and back sides of the board, and the maximum value (inches) is reported. The lower the value, the greater the bond.

Hot Peel: This test is performed in the same manner as the End Peel test except that it is conducted immediately upon removal from the line after the kiln.

Board Shear: This test allows for the evaluation of the board shear and splits and functions to provide an assessment of board drying and general core quality. For this test, pressure is gently used (e.g., by using forearms) to break a board into two separate pieces. Then, the board is sheared as far as it will shear or until adequate analysis is obtained. The shear is evaluated by determining the maximum width (inches) of the exposed core.

Hot Shear: This test is performed in the same manner as the Board Shear test except that it is conducted immediately upon removal from the line after the kiln.

Board Moisture: This test allows for determination of the moisture content of the board. The board moisture was determined using a T-8 moisture meter instrument. Initially, the instrument is held in the open air at least 3" away from the object and zeroed. The range selector should be in the No. 2 position and the Standard switch to the "In" position. Then, depress the handle switch ("On"). The instrument should read 50+/−1/2 scale divisions; if not, the trim screw may be used to adjust the reading to 50. Then resent the Standard to the "Out" position and keep the handle switch depressed. The instrument should read Zero; if not, adjust know to set the instrument to zero. Then, place the sensing head (electrode) on the gypsum panel and apply firm pressure to assure even contact of all sensing rings with the paper surface. Next, depress the bar switch in the handle ("On"). Then, read the pointer position on the scale and record the number. For each board, 5 measurements were taken.

Weight: The Board Weight provided is the weight of the board immediately after the heating device or drying device (e.g., kiln). The Corrected Weight After Drying is the weight of the board after additional drying to remove free moisture.

Example 1

In this example, starch was applied at the paper-gypsum core interface. The starch utilized was an acid modified hydrolyzed starch. The properties are provided in the table below.

|  | 1 | 2 | 3 | 4 | 5 | 6 |
|---|---|---|---|---|---|---|
| Interface Starch (lbs/MSF) | 1.2 | 1.2 | 1.2 | 1.2 | 1.2 | 1.2 |
| Core Starch (lbs/MSF) | 2.5 | 2.5 | 2.5 | 2.5 | 2.5 | 2.5 |
| Application Type | Roll-Coated | Roll-Coated | Roll-Coated | Sprayed | Sprayed | Sprayed |
| Board Weight (lbs/MSF) | 1400 | 1397 | 1406 | 1419 | 1409 | 1431 |
| Corrected Weight after Drying (lbs/MSF) | 1397 | 1408 | 1405 | 1403 | 1375 | 1407 |
| Board Moisture | 8-8-8-8-7 | 8-8-7-7-7 | 8-7-8-8-8 | 14-16-10-11-11 | 9-9-9-8-8 | 22-18-15-13-16 |
| Board Free Water | 0.109% | 0.126% | 0.168% | 0.510% | 0.125% | 1.519% |
| Dry Bond, Face | 0% | 0% | 0% | 0% | 0% | 0% |
| Dry Bond, Back | Trace | 2% | Trace | 3% | Trace | 4% |
| Hot Peel, Face | 0 | 0 | 0 | 0 | 0 | 0 |
| Hot Peel, Back | 0 | 0 | 0 | 0 | 0 | 0 |
| Hot Shear, Core | 1.58 | 1.75 | 1.68 | 1.68 | 1.58 | 1.5 |
| Hot Shear, Face | 0.58 | 0.58 | 0.83 | 1.08 | 0.33 | 0.68 |
| Hot Shear, Back | 1.92 | 1.42 | 1.83 | 3.25 | 1.83 | 2.83 |
| Average Nail Pull ($lb_f$) | 80.62 | 76.38 | 77.51 | 78.43 | 75.96 | 77.85 |
| Humidified Bond, Face at 2 Hours (%) | 0.0 | 0.0 | 0.0 | 0.0 | 0.0 | 0.0 |
| Humidified Bond, Back at 2 Hours (%) | 10.0 | 25.5 | 30.5 | 5.5 | 20.0 | 6.0 |
| Humidified Bond, Face at 20 Hours (%) | 0.0 | 0.0 | 0.0 | 0.0 | 0.0 | 0.0 |
| Humidified Bond, Back at 20 Hours (%) | 5.0 | 8.5 | 6.0 | 2.0 | 4.5 | 4.0 |

Example 2

In this example, starch was applied at the paper-gypsum core interface. The starch utilized was an acid modified hydrolyzed starch. The properties are provided in the table below.

|  | 7 | 8 | 9 | 10 | 11 |
|---|---|---|---|---|---|
| Interface Starch (lbs/MSF) | — | — | 1 | 1 | 1 |
| Core Starch (lbs/MSF) | 12 | 12 | 3 | 3 | 3 |
| Application Type | — | — | Roll-Coated | Roll-Coated | Roll-Coated |
| Board Weight (lbs/MSF) | 1406 | 1415 | 1390 | 1390 | 1434 |
| Board Moisture | 10-8-7-7-7 | 20-17-17-17-20 | 7-7-7-8-8 | 11-10-9-9-9 | 7-8-8-8-8 |
| Humidified Bond, Face at 2 Hours (%) | 0 | 0 | 0 | 0 | 0 |
| Humidified Bond, Back at 2 Hours (%) | 1 | 4 | 10 | 1 | 1 |
| Humidified Bond, Face at 20 Hours (%) | 0 | 0 | 0 | 0 | 0 |
| Humidified Bond, Back at 20 Hours (%) | 2 | 3 | 7 | 1 | 2 |
| End Peel, Face | 0 | 0 | 0 | 0 | 0 |
| End Peel, Back | 0.25 | 0 | 1.25 | 0.25 | 0.25 |
| Board Shear, Core | 2 | 2 | 1.5 | 1.5 | 1.5 |
| Board Shear, Face | 0.5 | 0.5 | 0.75 | 0.75 | 0.75 |
| Board Shear, Back | 1.25 | 1.25 | 1.75 | 1 | 1 |

-continued

|  | 7 | 8 | 9 | 10 | 11 |
|---|---|---|---|---|---|
| Average Nail Pull (lb$_f$) | 83.91 | 82.06 | 75.16 | 82.54 | 88.75 |
| Strength Ratio | 16.76 | 17.24 | 18.49 | 16.84 | 16.16 |

While particular embodiments of the present disclosure have been illustrated and described, it would be obvious to those skilled in the art that various other changes and modifications can be made without departing from the spirit and scope of the present disclosure. It is therefore intended to cover in the appended claims all such changes and modifications that are within the scope of this disclosure.

The invention claimed is:

1. A method of forming a gypsum panel, the method comprising:
   providing a first facing material;
   providing a starch slurry onto the first facing material, the starch slurry covering 98% or less of a deposition surface of the first facing material, the starch slurry being formed by combining starch and water at a shear rate of 4,500 rpm or more, the starch being present in the starch slurry in an amount of 1 wt. % or more based on the weight of the starch slurry, the starch being a solid;
   depositing a gypsum slurry comprising stucco and water onto the starch slurry on the first facing material;
   providing a second facing material on the gypsum slurry; and
   converting the stucco to calcium sulfate dihydrate.

2. The method of claim 1, wherein the second facing material is directly on the gypsum slurry.

3. The method of claim 1, wherein the starch slurry is further provided on the gypsum slurry and the second facing material is provided on the starch slurry on the gypsum slurry.

4. The method of claim 1, wherein the starch slurry is further provided on the second facing material such that it is present at an interface with the gypsum slurry.

5. The method of claim 1, wherein the first facing material is a paper facing material and the second facing material is a paper facing material.

6. The method of claim 1, wherein the starch slurry covers at least 75% of the deposition surface of the first facing material.

7. The method of claim 1, wherein the starch slurry includes starch in an amount of 50 wt. % or more based on a solids content of the starch slurry.

8. The method of claim 1, wherein a gypsum to starch weight ratio is from 0.001 to 10.

9. The method of claim 1, wherein the starch slurry is provided to form a continuous starch layer.

10. The method of claim 1, wherein the shear rate is 5,000 rpm or more.

11. The method of claim 1, wherein the gypsum slurry further comprises a starch.

12. The method of claim 11, wherein the starch is present in the gypsum slurry in an amount of 0.0001 wt. % to 10 wt. %.

13. The method of claim 1, wherein the first or second facing material is present on the face of the gypsum panel in an amount of 80% or more as determined according to a humidified bond test at 2 hours.

14. The method of claim 1, wherein the first or second facing material is present on the face of the gypsum panel in an amount of 80% or more as determined according to the humidified bond test at 20 hours.

15. The method of claim 1, wherein the gypsum panel has a weight of from 1,000 lbs/MSF to 4,000 lbs/MSF.

16. The method of claim 1, wherein the gypsum panel has a nail pull resistance of at least 80 lb$_f$.

17. A gypsum panel made according to the method of claim 1.

18. The method of claim 1, wherein the starch is present in the starch slurry in an amount of 5 wt. % or more based on the weight of the starch slurry.

19. The method of claim 1, when present, gypsum is present in the starch slurry in an amount of 0.1 wt. % or more to 10 wt. % or less.

20. A method of forming a gypsum panel, the method comprising:
   providing a first facing material;
   providing a starch slurry onto the first facing material, the starch slurry covering 98% or less of a deposition surface of the first facing material, the starch slurry being formed by combining starch, water, and gypsum at a shear rate of 4,500 rpm or more, the gypsum to starch weight ratio in the starch slurry being from 0.001 to 1, the starch being present in the starch slurry in an amount of 1 wt. % or more based on the weight of the starch slurry, the starch being a solid;
   depositing a gypsum slurry comprising stucco and water onto the starch slurry on the first facing material;
   providing a second facing material on the gypsum slurry; and
   converting the stucco to calcium sulfate dihydrate.

21. The method of claim 1, wherein the starch has a peak gelling temperature of 120° F. or more.

22. The method of claim 1, wherein the starch slurry covers 95% or less of the deposition surface of the first facing material.

* * * * *